June 16, 1936.   C. BARBARESCHI   2,044,560
PUMP FOR GASEOUS FLUIDS
Filed Feb. 15, 1934

Inventor

Patented June 16, 1936

2,044,560

UNITED STATES PATENT OFFICE 2,044,560

PUMP FOR GASEOUS FLUIDS

Carlo Barbareschi, Milan, Italy

Application February 15, 1934, Serial No. 711,347
In Belgium February 18, 1933

3 Claims. (Cl. 230—175)

This invention relates to improvements in a compressor which is particularly applicable for frigorific compression cycle, and has for its object to provide an improved construction which will obviate certain known inconveniences with existing compressors.

The invention will be described with reference to the accompanying drawing, in which:—

Figure 1:
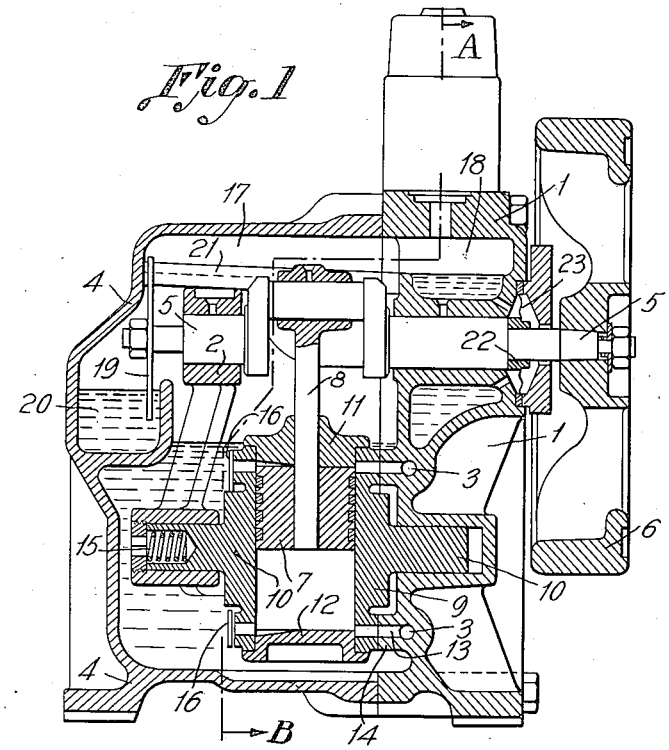

Fig. 1 is a longitudinal section of the compressor, and

Figure 2:
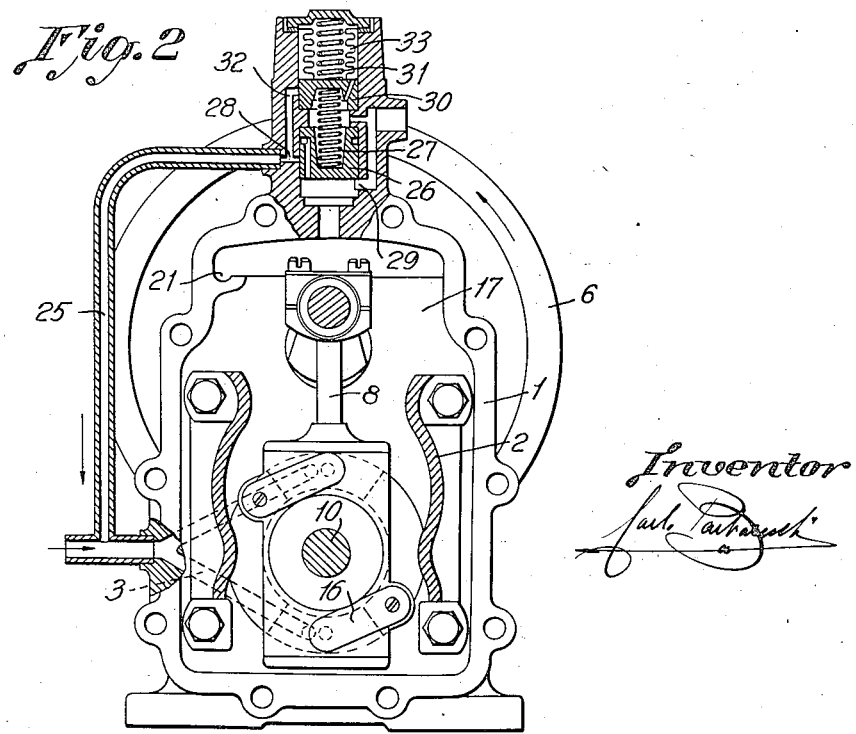

Fig. 2 is a similar view on line A. B. Fig. 1 with the cover removed.

A metal casing 1 is provided for supporting the movable parts of the compressor, having integral therewith, a projecting support 2. Passing through one side of this support 2 are conduits 3, which in turn, communicate with conduits 14 provided at the respective ends of a cylinder 9. Said conduits 3 and 14 are adapted to serve as inlets for admitting gas into the ends of the cylinder 9 during the suction stroke.

A removable cover 4 secured to the casing 1 is of such size, that, when removed, the mechanism can be easily inspected, repaired and/or adjusted whenever necessary.

A crank shaft 5 rotatably mounted in a bearing 2 integral with the casing 1, is adapted to convert rotary motion imparted to the flywheel 6, into reciprocating motion for the piston 7 through the connecting rod 8 rotatably mounted upon said crank shaft 5 and rigidly fixed to the piston 7. The inner end of the cylinder 9 is closed by a cover 11 and the connecting rod 8 is slidably mounted in the cover 11 in such manner that there is a fluid tight joint between these two parts.

The opposite end of the cylinder 9 is closed by a cover 12 as shown in Fig. 1.

Integral with the cylinder 9 are trunnions 10 rotatably mounted in bearings, formed by the casing 1, in order to allow the cylinder 9 to oscillate during the reciprocating movement of the piston, and in order to provide a fluid tight joint between the part of the cylinder 9 and casing 1 where the conduits are intermittently in communication with the ports 13, a helical spring 15 is fitted into a recess in one of the trunnions 10, and the opposite end abuts against the closed end of said bearing thereby providing a close sliding fit between the cylinder 9 and casing 1 at the side opposite to the spring 15.

Two non-return valves 16 consisting of laminated plates, are fitted over the exhaust ports provided at the ends of the cylinder 9, through which is forced, on the compression stroke of the piston, the compressed gas into a lubricating liquid contained in the casing 1, said liquid absorbs any fumes that may escape from the cylinder 9. The gas then rises into the upper part 17 of the casing 1, and any particles of oil carried thereby will separate therefrom and collect in chamber 18.

During working of the compressor, any excess oil is thrown into a pocket 20 formed by the casing 1, and a disc 19 fixed on to the end of the crank shaft 5, rotates in the oil contained in said pocket 20, and throws oil by centrifugal action into the upper part of the casing 1; some of this oil falls into a channel 21 which communicates with the chamber 18, so that the oil flowing into the chamber 18 flows through a conduit to the fluid tight packing 22 around the crankshaft, and through a conduit to one of the crank shaft bearings, so that all the moving parts are continuously lubricated.

A flexible membrane is arranged between the casing 1 and packing 22 which actuates as a resilient fluid tight joint and absorbs any vibrations.

The contact of the annular surfaces of the fluid tight packing is automatically regulated by the pressure of the gas in the container, the surface limited by the average circumference in the zone of contact is exposed on the one part, and the atmospheric pressure on the other part to the pressure of condensation of the cooling agent. With this the shaft is always thrust independently of the ring of fluid tight packing with which it rubs when a proportional charge of the air is produced for the uniform pressure.

Mounted in the upper part of the casing 1 is an auxiliary cylinder containing two small pistons 26 and 30 arranged in tandem, and having a helical spring 27 interposed between them, and a second helical spring between the upper piston 30 and cover fixed to the end of the auxiliary cylinder.

The lower piston 26 has a by-pass 28, which when this piston is at a certain position in the auxiliary cylinder, communicates with a by-pass 32 which latter, forms a connection with the conduits 3 by means of a pipe 25 and also terminates into a port in the auxiliary cylinder adjacent the piston 30, when at its lowest position.

The base of the auxiliary cylinder has a central aperture through which the gas is passed from the chamber 17, and a second by-pass 29 in the auxiliary cylinder provides an outlet for the gas. Said by-pass 29 also terminates into a port in the auxiliary cylinder between the two pistons 26 and 30.

The upper piston 30 is provided with a port passing through the head, a bellows 33 is disposed in the upper part of the auxiliary cylinder, and an aperture is provided in the cover on the end of the auxiliary cylinder forming an opening to atmospheric air.

The part of the piston 30 is to prevent the possibility of excessive supercharges forming in the chamber 17 during functioning. In effect the piston 30 is pushed downwards by the atmospheric pressure and by the pressure of the spring 31. The port in the piston 30 serves to form around the bellows 33 a pressure equal to that of condensation. In consequence, if the pressure of condensation becomes too great, the differential push upwards against the piston 30 causes this to rise again. At this moment the by-pass 32 is opened and establishes communication of the low pressure of the by-pass 25 with the high pressure and equilibrium is at once re-established.

The by-pass 29 on the contrary has the function of discharging the high pressure by causing it also to come above the piston 26 and below the piston 30. When the machine is stationary the spring 27 lets the piston 26 down; this produces the closure of the by-pass 29 and the pressure between the by-pass 25 and the chamber 17 becomes uniform.

During functioning there is formed in the chamber 17 a pressure slightly greater than that of condensation and that because the by-pass 28 is so narrow as not to permit free escape of the pressure to discharge. But when the machine stops the spring 27 drives the piston 26 downwards, which closes the by-pass 29 and opens communication between the by-pass 25 and the chamber 17. In this fashion the machine can move easily as there is no supercharge to overcome.

The supercharge is produced immediately after the movement of the machine and that allows functioning of the system of two piston valves which regulate the automatic working of the machine whilst completely avoiding all excessive supercharges.

In other words; the piston 26 serves to begin the weak supercharge which permits the functioning of the system of two pistons. The piston 30 thereby serving to avoid dangerous supercharges in the machine.

I claim:

1. A pump for gaseous fluids comprising in combination, a casing partially filled with lubricating oil, a removable cover fitted thereto, a cylinder closed at each end oscillatably mounted in said casing, a piston within said cylinder, a crankshaft mounted in the casing, a connecting rod slidably mounted in one end of the cylinder forming a driving connection between the piston and crank shaft, means for intermittently admitting gas into the respective ends of the cylinder, means for providing a sliding fluid tight connection between the casing and cylinder, means for discharging the compressed gas into the oil, means for imparting a super charge when starting, means for automatically controlling the pressure within said casing and means for automatically lubricating the mechanism.

2. A pump for gaseous fluids comprising in combination a casing partially filled with oil, a removable cover fitted to said casing, a cylinder closed at each end oscillatably mounted in said casing, a piston within said cylinder, a crank shaft mounted in the casing, a connecting rod slidably mounted in one end of the cylinder forming a driving connection between the piston and crank shaft, inlet ports at the respective ends of the cylinder for admitting gas on the suction stroke of the piston, spring means for imparting a sliding fluid tight connection between said casing and cylinder at the junction of the inlet ports, non-return valves at the ends of said cylinder diametrically opposite said inlet ports for discharging the compressed gas into the oil, means for providing a super-charge on starting, means for automatically controlling the pressure within said casing and means for automatic oiling of the moving parts.

3. A pump for gaseous fluids comprising in combination a casing partially filled with oil, a removable cover fitted to said casing, a cylinder closed at each end oscillatably mounted in said casing, a piston within the cylinder, a crank shaft mounted in the casing, a connecting rod slidably mounted in one end of the cylinder forming a driving connection between the piston and crank shaft and imparting an oscillatory motion to said cylinder, inlet ports at the respective ends of the cylinder for admitting gas on the suction stroke of said piston, spring means for providing a sliding fluid tight joint between said casing and cylinder at the junction of the inlet ports, non-return valves at the ends of said cylinder diametrically opposite said inlet ports for discharging the compressed gas into the oil, an auxiliary cylinder provided with a main by-pass and secondary by-pass fitted into said casing and formed with an opening at the top, two pistons each provided with a by-pass arranged in tandem in said auxiliary cylinder, a helical spring interposed between two said pistons, a second spring between the upper piston and top of said auxiliary cylinder, a bellows in the upper part of said auxiliary cylinder, said upper part forming a low pressure cylinder, the by-pass in the lower piston co-operating with the secondary by-pass permitting gas to pass from the said casing to the inlet ports of said cylinder when starting, the main by-pass allowing for the discharge of the compressed gas, said upper piston adapted to place the main by-pass in communication with the secondary by-pass with excess pressure in said casing, and automatic means for lubricating the moving parts.

CARLO BARBARESCHI.